United States Patent
Chen et al.

(10) Patent No.: US 9,667,314 B1
(45) Date of Patent: May 30, 2017

(54) PROGRAMMABLE REPEATER CIRCUITS AND METHODS

(71) Applicant: Altera Corporation, San Jose, CA (US)

(72) Inventors: Shuxian Chen, Fremont, CA (US); Andy Lee, San Jose, CA (US); Jeffrey Watt, Palo Alto, CA (US); Mark Chan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/970,367

(22) Filed: Dec. 15, 2015

(51) Int. Cl.
*H04B 3/36* (2006.01)
*H04B 3/18* (2006.01)

(52) U.S. Cl.
CPC .............. *H04B 3/36* (2013.01); *H04B 3/18* (2013.01)

(58) Field of Classification Search
CPC .... H04B 3/36; H04B 3/18; H04B 3/58; H04L 25/20
See application file for complete search history.

(56) References Cited

U.S. PATENT DOCUMENTS

| | | | |
|---|---|---|---|
| 3,823,401 A * | 7/1974 | Berg | H04L 5/22 370/279 |
| 5,671,432 A | 9/1997 | Bertolet et al. | |
| 6,294,926 B1 * | 9/2001 | Cline | H03K 19/1737 326/39 |
| 6,417,945 B2 * | 7/2002 | Ishikawa | G02B 6/29377 398/79 |
| 6,549,542 B1 * | 4/2003 | Dong | H04B 7/264 370/441 |
| 6,664,807 B1 * | 12/2003 | Crotty | G11C 7/1048 326/39 |
| 7,304,503 B2 | 12/2007 | Masleid et al. | |
| 7,394,286 B2 | 7/2008 | Hecht | |
| 7,768,295 B2 | 8/2010 | Pitkethly et al. | |
| 8,035,425 B2 | 10/2011 | Masleid et al. | |
| 8,837,467 B2 * | 9/2014 | Kyles | H03M 9/00 370/366 |
| 2004/0228203 A1 * | 11/2004 | Koo | G11C 7/1066 365/233.1 |
| 2005/0243614 A1 * | 11/2005 | Kang | G11C 7/1051 365/189.05 |
| 2014/0281112 A1 * | 9/2014 | Rao | G06F 13/40 710/317 |

* cited by examiner

*Primary Examiner* — Jean B Corrielus
(74) *Attorney, Agent, or Firm* — Steven J. Cahill (57) ABSTRACT

An integrated circuit includes a buffer circuit, a receiving circuit, and a programmable repeater circuit. The programmable repeater circuit includes a routing input and an enable input. The programmable repeater circuit buffers an input signal received at the routing input from the buffer circuit through a first conductor to generate an output signal that is provided to an input of the receiving circuit through a second conductor only in response to an enable signal at the enable input enabling the programmable repeater circuit.

20 Claims, 7 Drawing Sheets

PROGRAMMABLE REPEATER CIRCUITS AND METHODS

FIELD OF THE DISCLOSURE

The present disclosure relates to electronic circuits, and more particularly, to programmable repeater circuits and methods.

BACKGROUND

In an integrated circuit (IC), some signals may be transmitted through long metal conductors. A signal transmitted through a long metal conductor may experience negative effects, such as propagation delay and distortion. These negative effects can be decreased by reducing the resistor-capacitor (RC) constant of the metal conductor. However, in some IC designs, the RC constant cannot be reduced enough to meet the design specifications. One other approach involves inserting a repeater circuit along the length of a long metal conductor in order to reduce distortion and propagation delay in the signal.

BRIEF SUMMARY

According to some embodiments disclosed herein, an integrated circuit includes a buffer circuit, a receiving circuit, and a programmable repeater circuit. The programmable repeater circuit includes a routing input and an enable input. The programmable repeater circuit buffers an input signal received at the routing input from the buffer circuit through a first conductor to generate an output signal that is provided to an input of the receiving circuit through a second conductor only in response to an enable signal at the enable input enabling the programmable repeater circuit.

Various objects, features, and advantages of the present invention will become apparent upon consideration of the following detailed description and the accompanying drawings.

DETAILED DESCRIPTION

According to some embodiments disclosed herein, a programmable repeater circuit reduces delay in a signal in an integrated circuit. The programmable repeater circuit has an enable input that is coupled to receive an enable signal. The programmable repeater circuit receives an input signal from a buffer circuit through a first conductor. The programmable repeater circuit buffers the input signal to generate an output signal at its output node in response to the enable signal enabling the programmable repeater circuit. The programmable repeater circuit toggles the output signal based on changes in the logic state of the input signal in response to being enabled by the enable signal. The output signal is provided through a second conductor to a receiving circuit. The first and second conductors may, for example, be long conductors relative to other conductors in the integrated circuit. The programmable repeater circuit prevents the input signal received from the buffer circuit from being driven to the receiving circuit through the second conductor in response to the enable signal at the enable input disabling the programmable repeater circuit.

When the programmable repeater circuit is enabled by the enable signal, the programmable repeater circuit can reduce propagation delay in the output signal that is provided to the receiving circuit. For example, if the programmable repeater circuit is inserted in the middle of a long conductor between the buffer and receiving circuits, such that the first and second conductors have about the same length, then the programmable repeater circuit reduces the resistor-capacitor (RC) delay introduced into the signals transmitted through the first and second conductors by about 50%.

In some embodiments, the programmable repeater circuit causes the output signal to remain in a constant and predefined logic state in response to the enable signal disabling the programmable repeater circuit. In these embodiments, the programmable repeater circuit reduces power consumption by not having to charge and discharge capacitances on the second conductor when the programmable repeater circuit is disabled by the enable signal. Examples of these embodiments are disclosed herein with respect to FIGS. 1 and 2A-2C.

In alternative embodiments, the programmable repeater circuit does not drive its output node to a predefined voltage in response to the enable signal disabling the programmable repeater circuit. In these embodiments, the voltage at the output node of the programmable repeater circuit may float when the programmable repeater circuit is disabled. Alternatively, a signal from another source can be driven through the second conductor to the receiving circuit when the programmable repeater circuit is disabled. Thus, the programmable repeater circuit can increase the number of signal paths that are provided through conductors between circuits in an integrated circuit. Examples of these embodiments are disclosed herein with respect to FIGS. 3-5.

Figure 1:
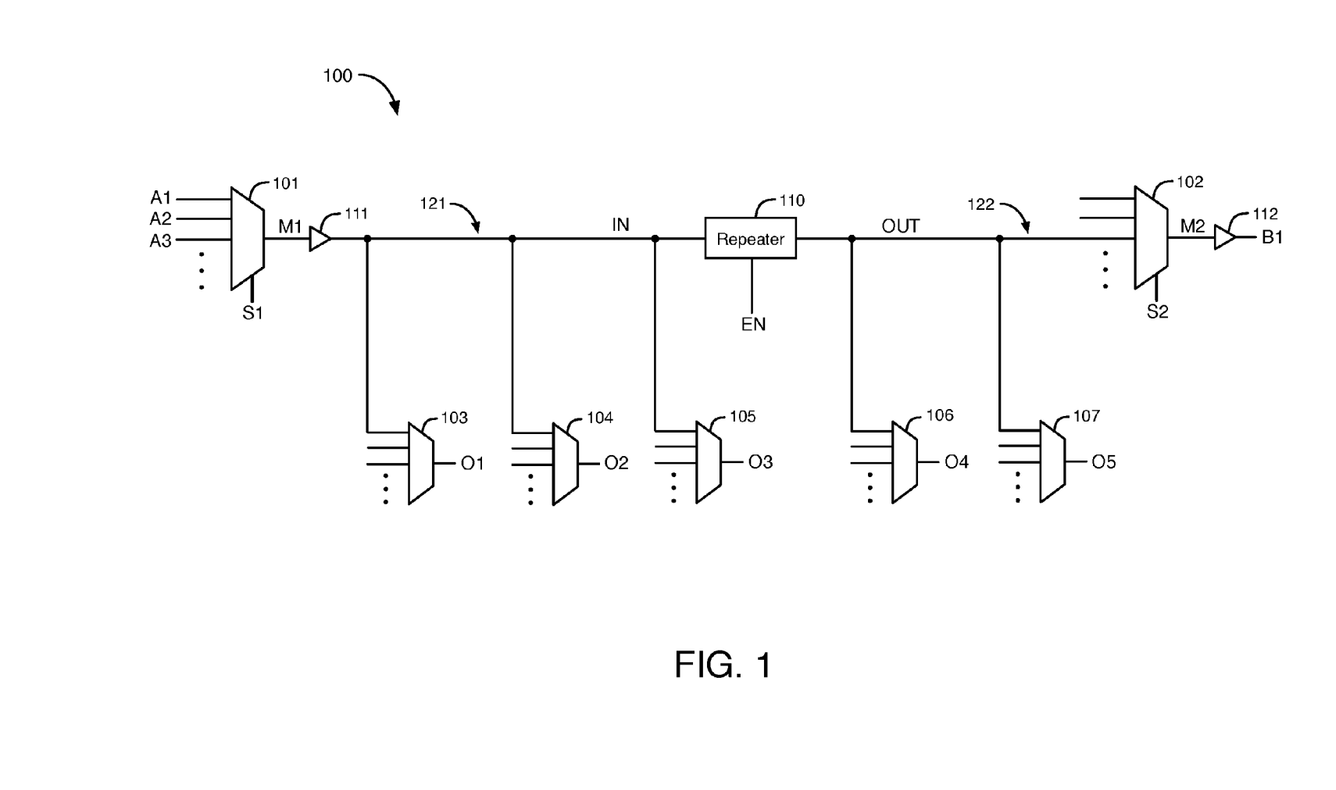
FIG. 1 illustrates an example of routing circuitry in an integrated circuit (IC) that includes a programmable repeater circuit, according to an embodiment.

FIG. 1 illustrates an example of routing circuitry 100 in an integrated circuit that includes a programmable repeater circuit 110, according to an embodiment. Figure (FIG. 1 illustrates only a portion of the integrated circuit. Routing circuitry 100 includes multiplexer circuits 101-107, buffer circuits 111-112, conductors 121-122, and programmable repeater circuit 110. Programmable repeater circuit 110 causes its output signal OUT to remain in a constant and predefined logic state in response to an enable signal EN disabling programmable repeater circuit 110.

The output of multiplexer circuit 101 is coupled to the input of buffer circuit 111. The output of buffer circuit 111 is coupled to a routing input of repeater circuit 110 and to a multiplexing input of each of multiplexer circuits 103-105 through first conductor 121. The output of repeater circuit 110 is coupled to a multiplexing input of each of multiplexer circuits 102 and 106-107 through second conductor 122. The output of multiplexer circuit 102 is coupled to the input of buffer circuit 112. Conductors, such as conductors 121-122, may also be referred to as wires or routing conductors.

Routing circuitry 100 shown in FIG. 1 may be fabricated in any type of integrated circuit, such as a field programmable gate array (FPGA), a programmable logic device (PLD), a complex programmable logic device (CPLD), a programmable logic array (PLA), an application specific integrated circuit (ASIC), a memory integrated circuit, a central processing unit, a microprocessor, an analog integrated circuit, etc.

As shown in FIG. 1, a set of signals A1, A2, A3, etc. are provided to multiplexing inputs of multiplexer circuit 101. Multiplexer circuit 101 selects one of the signals A1, A2, A3, etc. at its multiplexing inputs based on the values of select signals S1. Multiplexer circuit 101 generates a signal M1 at its output by buffering the signal that is selected based on select signals S1. Buffer circuit 111 buffers signal M1 to generate a buffered signal IN at its output on conductor 121. Signal IN is provided through conductor 121 to a routing input of repeater circuit 110 and to a multiplexing input of each of multiplexer circuits 103-105. Buffer circuit 111 functions as a driver circuit. One or more of multiplexers 103-105 can be programmed by select signals (not shown) to select signal IN to generate output signals O1-O3, respectively.

The enable signal EN is provided to an enable input of repeater circuit 110. The enable signal EN at the enable input of repeater circuit 110 may be generated from any type of circuit. For example, the enable signal EN may be stored in a storage circuit such as a configurable random access memory circuit (CRAM), generated by a control circuit, or provided externally from a pad of the integrated circuit.

In response to the enable signal EN being asserted, programmable repeater circuit 110 is enabled to generate an output signal OUT at its output based on input signal IN. Repeater circuit 110 may, for example, buffer input signal IN to generate a buffered output signal OUT in response to the enable signal EN being asserted. Signal EN may be asserted by driving signal EN to a logic high state or to a logic low state. Signals received and generated by repeater circuits, such as signals IN and OUT, may be any type of signals, such as clock signals, control signals, or data signals.

Output signal OUT is provided from the output of repeater circuit 110 through conductor 122 to a multiplexing input of each of multiplexer circuits 102 and 106-107. One or both of multiplexers 106-107 can be programmed by select signals (not shown) to select signal OUT to generate output signals O4-O5, respectively. Multiplexer circuit 102 selects one of the signals at its multiplexing inputs based on the values of select signals S2. Multiplexer circuit 102 generates a signal M2 at its output by buffering the signal at one of its multiplexing inputs that is selected based on select signals S2. Select signals S2 can be set to values that cause multiplexer circuit 102 to select signal OUT and to generate signal M2 as a buffered version of signal OUT. Buffer circuit 112 buffers signal M2 to generate a buffered signal B1 at its output.

In response to the enable signal EN being asserted, programmable repeater circuit 110 reduces the delay for the information indicated by signal IN to propagate from the output of buffer circuit 111 to an input of multiplexer circuit 102 as signal OUT through conductors 121-122. For example, if repeater circuit 110 is inserted halfway between buffer circuit 111 and multiplexer circuit 102, such that conductors 121-122 have the same length, then repeater circuit 110 reduces the delay in signals IN and OUT that is caused by resistance and capacitance on conductors 121-122 (i.e., the RC delay) by 50%. According to this example, a long conductor having a length that approximately equals the length of conductor 121 plus the length of conductor 122 generates a signal delay T1 that equals RC, where R is the resistance of the long conductor, and C is the capacitance of the long conductor. The signal delay T2 caused by conductors 121 and 122 equals $(R/2) \times (C/2)+(R/2) \times (C/2)=RC/2$, which is a 50% reduction relative to delay T1. Each of conductors 121 and 122 has half the resistance (R/2) and half the capacitance (C/2) of the long conductor. Because repeater circuit 110 significantly reduces the capacitive and resistive load from the conductor 121 coupled to the output of buffer circuit 111, the size of buffer circuit 111 can be reduced to decrease the power consumption and the die area of buffer circuit 111.

In response to the enable signal EN being de-asserted, programmable repeater circuit 110 is disabled, and programmable repeater circuit 110 causes output signal OUT on conductor 122 to remain in a constant and predefined logic state. When repeater circuit 110 is disabled, repeater circuit 110 prevents input signal IN from being driven to multiplexer circuits 102 and 106-107 as output signal OUT. Repeater circuit 110 may reduce power consumption, because repeater circuit 110 holds output signal OUT in a constant logic state when repeater circuit 110 is disabled. Thus, repeater circuit 110 is not charging and discharging the capacitances of conductor 122 and multiplexer circuits 102 and 106-107 to toggle signal OUT. When repeater circuit 110 is disabled, input signal IN may still be provided to other circuitry through multiplexers 103-105.

Figure 2A:
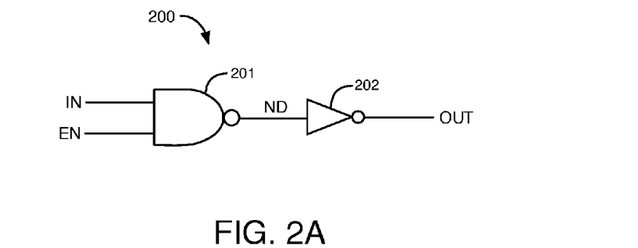
FIG. 2A illustrates a first example of a programmable repeater circuit, according to an embodiment.

FIG. 2A illustrates a first example of a programmable repeater circuit 200, according to an embodiment. The programmable repeater circuit 200 of FIG. 2A is an example of programmable repeater circuit 110 of FIG. 1. Programmable repeater circuit 200 includes a NAND logic gate circuit 201 and an inverter circuit 202. Input signal IN and enable signal EN are provided to inputs of NAND gate circuit 201. NAND gate circuit 201 generates a signal ND at its output in response to signals IN and EN. NAND gate circuit 201 performs a NAND Boolean logic function on the logic states of signals IN and EN to generate the logic state of signal ND. Inverter circuit 202 inverts the logic state of signal ND at its input to generate the logic state of output signal OUT at its output.

In response to the enable signal EN being asserted to a logic high state, programmable repeater circuit 200 is enabled to generate signal OUT based on input signal IN. Specifically, NAND gate circuit 201 causes signal ND to have the opposite logic state of input signal IN when enable signal EN is in a logic high state. Inverter circuit 202 inverts the logic state of signal ND to generate the logic state of signal OUT. Repeater circuit 200 functions as a non-inverting buffer circuit when it is enabled.

In response to the enable signal EN being de-asserted to a logic low state, programmable repeater circuit 200 is disabled. In response to the enable signal EN being in a logic low state, NAND gate circuit 201 prevents signal ND from being generated based on input signal IN, NAND gate circuit 201 causes signal ND to remain in a logic high state, and inverter circuit 202 causes signal OUT to remain in a logic low state. Thus, programmable repeater circuit 200 functions as an AND logic gate. The truth table for programmable repeater circuit 200 is shown in Table 1 below.

TABLE 1

| EN | IN | OUT |
|----|----|-----|
| 1  | 1  | 1   |
| 1  | 0  | 0   |
| 0  | 1  | 0   |
| 0  | 0  | 0   |

Figure 2B:
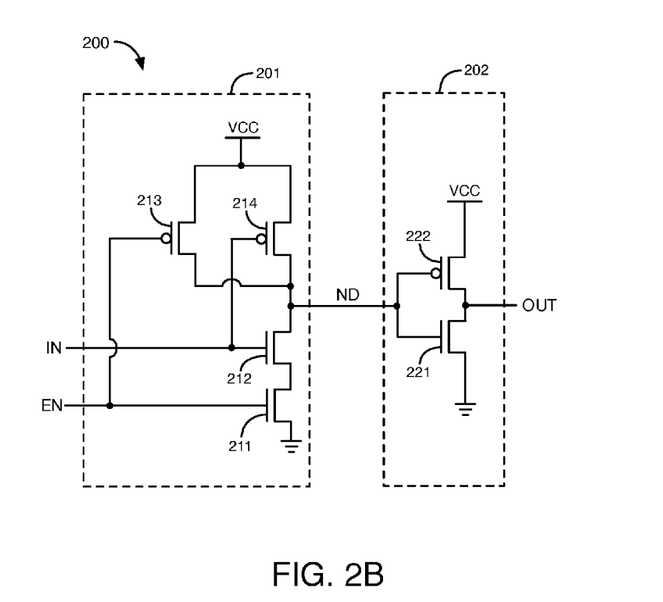
FIG. 2B illustrates more details of the programmable repeater circuit shown in FIG. 2A, according to an embodiment.

FIG. 2B illustrates more details of the programmable repeater circuit 200 of FIG. 2A, according to an embodiment. In the example of FIG. 2B, programmable repeater circuit 200 also includes NAND logic gate circuit 201 and inverter circuit 202. NAND logic gate circuit 201 includes n-channel field-effect transistors (FETs) 211-212 and p-channel FETs 213-214, and inverter circuit 202 includes n-channel FET 221 and p-channel FET 222. The sources of transistors 213-214 and 222 are coupled to a node at a supply voltage VCC. The sources of transistors 211 and 221 are coupled to a node at a ground voltage. The gates of transistors 212 and 214 are coupled to the routing input of the programmable repeater circuit to receive input signal IN. The gates of transistors 211 and 213 are coupled to the enable input of the programmable repeater circuit to receive enable signal EN. The drains of transistors 212-214 and the gates of transistors 221-222 are coupled to the node at signal ND. The drains of transistors 221-222 are coupled to the output of the programmable repeater circuit to generate signal OUT.

In response to enable signal EN being in a logic low state disabling repeater circuit 200, transistor 211 is off, and transistor 213 is on, which pulls signal ND to VCC. In response to signal ND being at VCC, transistor 222 is off, and transistor 221 is on, which pulls output signal OUT to ground. Thus, repeater circuit 200 maintains signal OUT in a constant logic low state in response to signal EN being in a logic low state. In response to enable signal EN being in a logic high state, transistor 213 is off, transistors 211-212 and 214 function as an inverter circuit, and repeater circuit 200 functions as a non-inverting buffer circuit. The truth table shown in Table 1 above also applies to the operation of the circuitry in FIG. 2B.

Figure 2C:
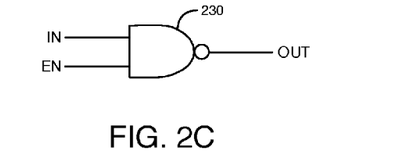
FIG. 2C illustrates a second example of a programmable repeater circuit, according to an embodiment.

FIG. 2C illustrates a second example of a programmable repeater circuit, according to an embodiment. The programmable repeater circuit 230 of FIG. 2C is an example of programmable repeater circuit 110 of FIG. 1. In the embodiment of FIG. 2C, the programmable repeater circuit is a NAND logic gate circuit 230. Input signal IN and enable signal EN are provided to inputs of NAND gate circuit 230. NAND gate circuit 230 generates an output signal OUT at its output in response to signals IN and EN. NAND gate circuit 230 performs a NAND Boolean logic function on the logic states of signals IN and EN to generate the logic state of output signal OUT. In response to the enable signal EN being de-asserted to a logic low state, programmable repeater circuit 230 is disabled, and repeater circuit 230 maintains output signal OUT in a constant logic high state. Thus, when repeater circuit 230 is disabled, repeater circuit 230 couples its output node at OUT to the supply voltage. If repeater circuit 230 is used as repeater circuit 110, then repeater circuit 230 maintains the voltage on conductor 122 in a logic high state when repeater circuit 230 is disabled by enable signal EN.

In the embodiment of FIG. 2C, the programmable repeater circuit does not include inverter circuit 202. As a result, the programmable repeater circuit of FIG. 2C consumes less power and uses less die area than the programmable repeater circuit of FIG. 2B. However, the programmable repeater circuit of FIG. 2C inverts the logic state of output signal OUT relative to the logic state of input signal IN when the enable signal EN is asserted. The inversion that programmable repeater circuit 230 generates in signal OUT may be compensated for by circuitry coupled to the output of buffer circuit 112 or by software.

Figure 2D:
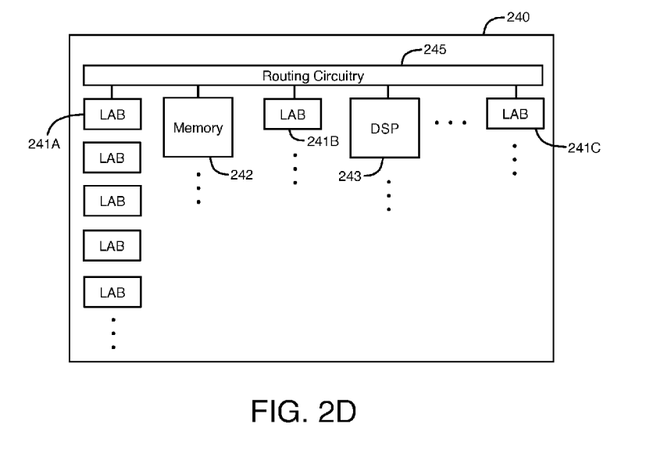
FIG. 2D illustrates an example of an integrated circuit (IC) that includes routing circuitry, according to an embodiment.

FIG. 2D illustrates an example of an integrated circuit (IC) 240 that includes routing circuitry, according to an embodiment. As shown in FIG. 2D, IC 240 includes routing circuitry 245, one or more memory circuits 242, and one or more digital signal processing (DSP) circuits 243. IC 240 also includes several programmable logic array block (LAB) circuits, including LAB circuits 241A-241C. Routing circuitry 245 includes one or more programmable repeater circuits. Routing circuitry 100 of FIG. 1 is an example of routing circuitry 245 of FIG. 2D. IC 240 may be a programmable logic integrated circuit (e.g., an FPGA).

In the embodiment of FIG. 2D, routing circuitry 245 can route a signal between two or more of LAB circuits 241A-241C, memory circuit 242, and DSP circuit 243 through a programmable repeater circuit (e.g., repeater circuit 110). For example, routing circuitry 100/245 can route a signal from LAB circuit 241A through multiplexer circuit 101, buffer circuit 111, programmable repeater circuit 110, multiplexer circuit 102, and buffer circuit 112 to LAB circuit 241C when repeater circuit 110 is enabled. Routing circuitry 100/245 can also route the signal to any of memory circuit 242, LAB circuit 241B, and/or DSP circuit 243 through multiplexer circuits 103-107. Alternatively, programmable repeater circuit 110 can be disabled to cause routing circuitry 100/245 to only route a signal from LAB circuit 241A to a subset of the circuitry coupled to routing circuitry 100/245, e.g., memory circuit 242 and/or LAB circuit 241B, through multiplexer circuits 101 and 103-105.

Figure 2E:
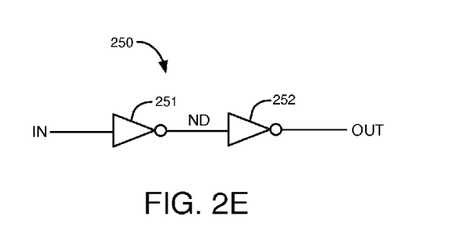
FIG. 2E illustrates an example of a non-programmable, non-inverting repeater circuit, according to an embodiment.

FIG. 2E illustrates an example of a non-programmable, non-inverting repeater circuit 250, according to an embodiment. Non-programmable repeater circuit 250 includes two inverter circuits 251-252. Repeater circuit 250 buffers signal IN to generate signal OUT. Signal ND is an intermediate inverted signal generated at the output of inverter 251 and provided to the input of inverter 252. Repeater circuit 250 is not responsive to an enable or control signal and cannot be disabled by an enable or control signal. According to an embodiment, non-programmable, non-inverting repeater circuit 250 can be used to buffer a signal that is transmitted through a long routing conductor in a programmable logic integrated circuit, such as a programmable logic device (PLD), a field programmable gate array (FPGA), or a programmable logic array (PLA). For example, programmable repeater circuit 110 of FIG. 1 can be replaced with non-programmable repeater circuit 250 in routing circuitry 100 in a programmable logic integrated circuit to drive a signal from conductor 121 to conductor 122.

Figure 3:
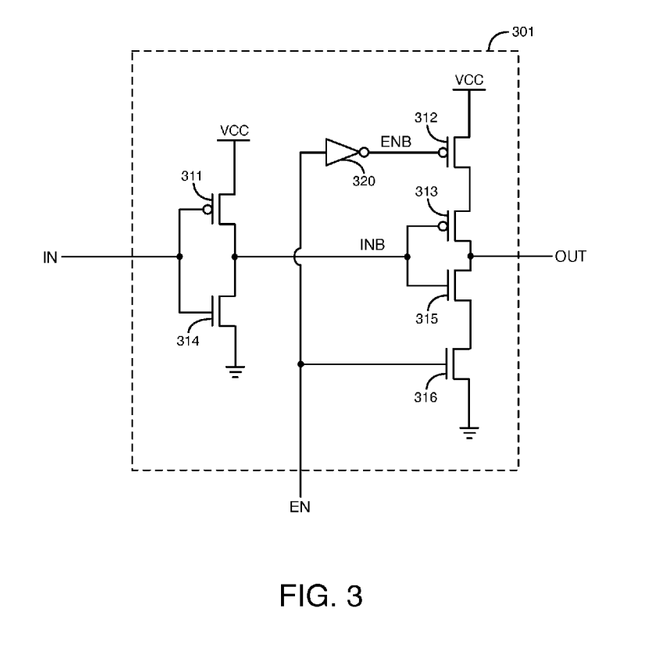
FIG. 3 illustrates a third example of a programmable repeater circuit, according to an embodiment.

FIG. 3 illustrates another example of a programmable repeater circuit 301, according to an embodiment. Programmable repeater circuit 301 does not drive its output node to a predefined voltage in response to enable signal EN disabling programmable repeater circuit 301. The voltage at the output node of programmable repeater circuit 301 may float when programmable repeater circuit 301 is disabled. Alternatively, a signal from another source may be driven through a conductor at the output node when programmable repeater circuit 301 is disabled. Programmable repeater circuit 301 can increase the number of signal paths that are provided through conductors between circuits in an integrated circuit.

Programmable repeater circuit 301 includes p-channel FETs 311-313, n-channel FETs 314-316, and inverter circuit 320. The sources of transistors 311-312 are coupled to a node at supply voltage VCC. The sources of transistors 314 and 316 are coupled to a node at the ground voltage. The gates of transistors 311 and 314 are coupled to the routing input of repeater circuit 301 to receive input signal IN. The drains of transistors 311 and 314 are coupled to the gates of transistors 313 and 315. The drains of transistors 313 and 315 are coupled to the output node of circuit 301 at signal OUT. The gate of transistor 316 is coupled to receive an enable signal EN at an enable input. Inverter circuit 320 generates an inverted enable signal ENB by inverting enable signal EN. The gate of transistor 312 is coupled to receive inverted enable signal ENB.

Transistors 311 and 314 are coupled together to form a CMOS inverter circuit. Transistors 311 and 314 invert input signal IN to generate an inverted signal INB at the gates of transistors 313 and 315. Transistors 312-313 and 315-316 are coupled together in series to form an inverting programmable buffer circuit, which may also be referred to as an inverting tristate buffer circuit.

When the enable signal EN is de-asserted to a logic low state, inverter circuit 320 de-asserts signal ENB to a logic high state. In response to signal EN being in a logic low state, transistor 316 is off. In response to signal ENB being in a logic high state, transistor 312 is off. When transistors 312 and 316 are off, transistors 313 and 315 do not draw current, and repeater circuit 301 is disabled. Repeater circuit 301 does not generate an output signal OUT at its output node in response to the input signal IN when repeater circuit 301 is disabled. Instead, when repeater circuit 301 is disabled, repeater circuit 301 decouples its output node from supply voltage VCC and from the ground voltage, and the voltage at the output node of repeater circuit 301 either floats or is driven by other circuitry.

When the enable signal EN is asserted to a logic high state, inverter circuit 320 drives signal ENB to a logic low state. In response to signal EN being in a logic high state, transistor 316 is on. In response to signal ENB being in a logic low state, transistor 312 is on. When transistors 312 and 316 are on, transistors 312-313 and 315-316 function as an inverter circuit to generate signal OUT by inverting signal INB. Thus, when transistors 312 and 316 are on, repeater circuit 301 functions as a non-inverting buffer circuit that generates output signal OUT as a buffered version of input signal IN. The truth table for programmable repeater circuit 301 is shown below in Table 2.

TABLE 2

| EN | IN | OUT |
|---|---|---|
| 1 | 1 | 1 |
| 1 | 0 | 0 |
| 0 | 1 | Floating |
| 0 | 0 | Floating |

Figure 4:
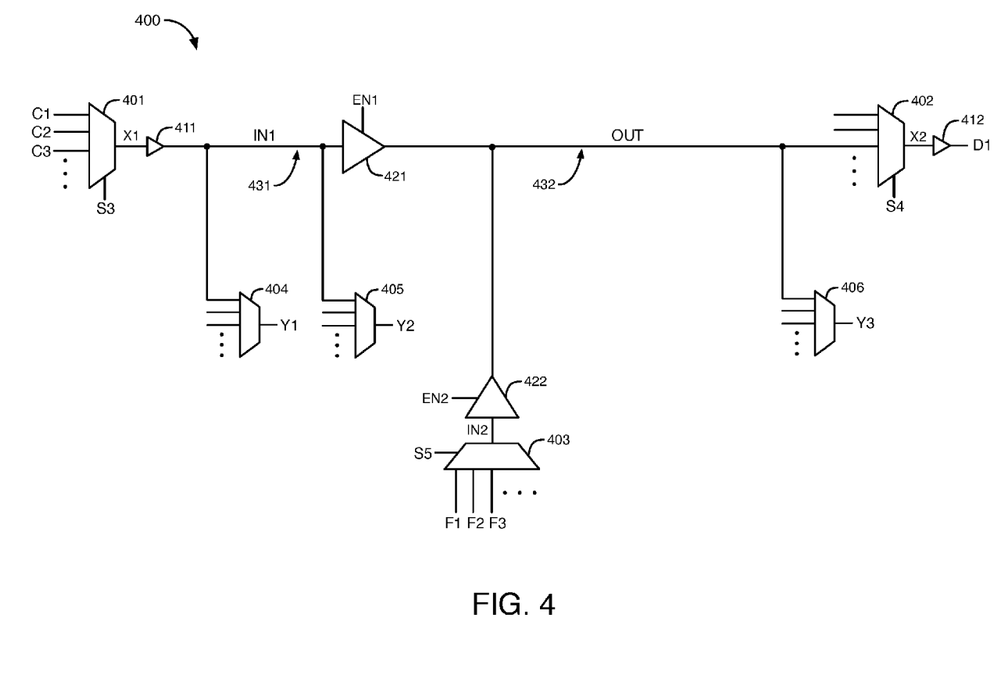
FIG. 4 illustrates another example of routing circuitry in an integrated circuit that includes programmable repeater circuits, according to a further embodiment.

FIG. 4 illustrates another example of routing circuitry 400 in an integrated circuit that includes programmable repeater circuits, according to a further embodiment. Routing circuitry 400 includes multiplexer circuits 401-406, buffer circuits 411-412, programmable repeater circuits 421-422, and conductors 431-432. According to various embodiments, one or both of programmable repeater circuits 421-422 of FIG. 4 have the architecture of programmable repeater circuit 301 shown in FIG. 3. Signals IN, OUT, and EN in FIG. 3 correspond to signals IN1, OUT, and EN1, respectively, for repeater circuit 421. Signals IN, OUT, and EN in FIG. 3 correspond to signals IN2, OUT, and EN2, respectively, for repeater circuit 422.

The output of multiplexer circuit 401 is coupled to the input of buffer circuit 411. The output of buffer circuit 411 is coupled to a routing input of repeater circuit 421 and to a multiplexing input of each of multiplexer circuits 404-405 through conductor 431. The output of repeater circuit 421 is coupled to a multiplexing input of each of multiplexer circuits 402 and 406 through conductor 432. The output of multiplexer circuit 402 is coupled to the input of buffer circuit 412. The output of multiplexer circuit 403 is coupled to a routing input of repeater circuit 422. The output of repeater circuit 422 is coupled to conductor 432.

Figure (FIG. 4 illustrates only a portion of the integrated circuit. Routing circuitry 400 shown in FIG. 4 may be fabricated in any type of integrated circuit, such as a programmable logic integrated circuit, an ASIC, a memory integrated circuit, a central processing unit, a microprocessor, etc.

According to an embodiment, routing circuitry 400 of FIG. 4 is an example of routing circuitry 245 shown in FIG. 2D. In this embodiment, routing circuitry 400 can route a signal between two or more of LAB circuits 241A-241C, memory circuit 242, and DSP circuit 243 through programmable repeater circuit 421 or 422.

As shown in FIG. 4, a set of input signals C1, C2, C3, etc. are provided to multiplexing inputs of multiplexer circuit 401. Multiplexer circuit 401 selects one of the input signals C1, C2, C3, etc. at its multiplexing inputs based on the values of select signals S3. Multiplexer circuit 401 generates a signal X1 at its output by buffering the input signal selected based on select signals S3. Buffer circuit 411 buffers signal X1 to generate a buffered signal IN1 at its output on conductor 431. Buffer circuit 411 functions as a driver circuit. Signal IN1 is provided through conductor 431 to a routing input of repeater circuit 421 and to a multiplexing input of each of multiplexer circuits 404-405. One or both of multiplexers 404-405 can be programmed by select signals (not shown) to select signal IN1 to generate output signals Y1-Y2, respectively. Signals Y1-Y2 may, for example, be provided to programmable LAB circuits, memory circuits, DSP circuits, etc.

Enable signals EN1-EN2 are provided to enable inputs of repeater circuits 421-422, respectively. Circuitry 400 can be set into at least two configurations. In a first configuration of circuitry 400, repeater circuit 421 is enabled, and repeater circuit 422 is disabled. Repeater circuit 421 is enabled to generate an output signal OUT at its output based on input signal IN1 at its routing input in response to the enable signal EN1 being asserted. Repeater circuit 421 may, for example, buffer input signal IN1 to generate a buffered output signal OUT in response to the enable signal EN1 being asserted.

In the first configuration, output signal OUT is provided from the output of repeater circuit 421 through conductor 432 to a multiplexing input of each of multiplexer circuits 402 and 406. Multiplexer 406 can be programmed by select signals (not shown) to select signal OUT to generate output signal Y3. Multiplexer circuit 402 selects one of the signals at its multiplexing inputs based on the values of select signals S4. Multiplexer circuit 402 generates a signal X2 at its output by buffering the signal selected based on select signals S4. Select signals S4 can be set to values that cause multiplexer circuit 402 to select signal OUT and to generate signal X2 as a buffered version of signal OUT. Buffer circuit 412 buffers signal X2 to generate a buffered signal D1 at its output.

When programmable repeater circuit 421 is enabled by enable signal EN1, repeater circuit 421 reduces the delay for the information indicated by signal IN1 to propagate from the output of buffer circuit 411 to an input of multiplexer circuit 402 as signal OUT through conductors 431-432. For example, repeater circuit 421 may reduce the delay through conductors 431-432 by half if repeater circuit 421 is placed halfway between buffer circuit 411 and multiplexer circuit 402. Repeater circuit 421 may reduce the power consumption of circuitry 400 by allowing the size of buffer circuit 411 to be decreased.

When repeater circuit 421 is enabled by enable signal EN1 in the first configuration, programmable repeater circuit 422 is disabled by enable signal EN2 to avoid contention on conductor 432. Enable signal EN2 is de-asserted to disable repeater circuit 422. Enable signal EN2 may be an inverted version of enable signal EN1.

Multiplexer circuit 403 selects one of the input signals F1, F2, F3, etc. at its multiplexing inputs based on the values of select signals S5. Multiplexer circuit 403 generates a signal IN2 at its output by buffering the input signal that is selected based on select signals S5. Signal IN2 is provided through a conductor to a routing input of repeater circuit 422. When repeater circuit 422 is disabled, repeater circuit 422 prevents signal IN2 from being driven to multiplexer circuit 402 on conductor 432. Repeater circuit 422 does not generate a signal on conductor 432 when repeater circuit 422 is disabled. In response to repeater circuit 422 being disabled, repeater circuit 422 decouples its output node from the supply voltage and from ground, as discussed with respect to FIG. 3.

In a second configuration of circuitry 400, repeater circuit 421 is disabled, and repeater circuit 422 is enabled. Repeater circuit 422 is enabled to generate an output signal OUT at its output based on input signal IN2 at its routing input in response to the enable signal EN2 being asserted. Repeater circuit 422 may, for example, buffer input signal IN2 to generate a buffered output signal OUT in response to the enable signal EN2 being asserted. Multiplexer circuit 402 and buffer circuit 412 can generate signals X2 and D1, respectively, based on signal OUT, as discussed above.

When repeater circuit 422 is enabled, repeater circuit 421 is disabled by de-asserting enable signal EN1. When repeater circuit 421 is disabled, repeater circuit 421 prevents input signal IN1 from being driven to an input of multiplexer circuit 402 through conductor 432. In response to repeater circuit 421 being disabled, repeater circuit 421 decouples its output node from the supply voltage and from ground, as discussed with respect to FIG. 3.

In the second configuration, routing circuitry 400 provides information from one of signals F1, F2, F3, etc. to multiplexer circuits 402 and 406. Circuitry 400 provides increased routing flexibility in two configurations that allow information to be transmitted to multiplexers 402 and 406 through conductor 432 from either one of multiplexers 401 or 403.

Figure 5:
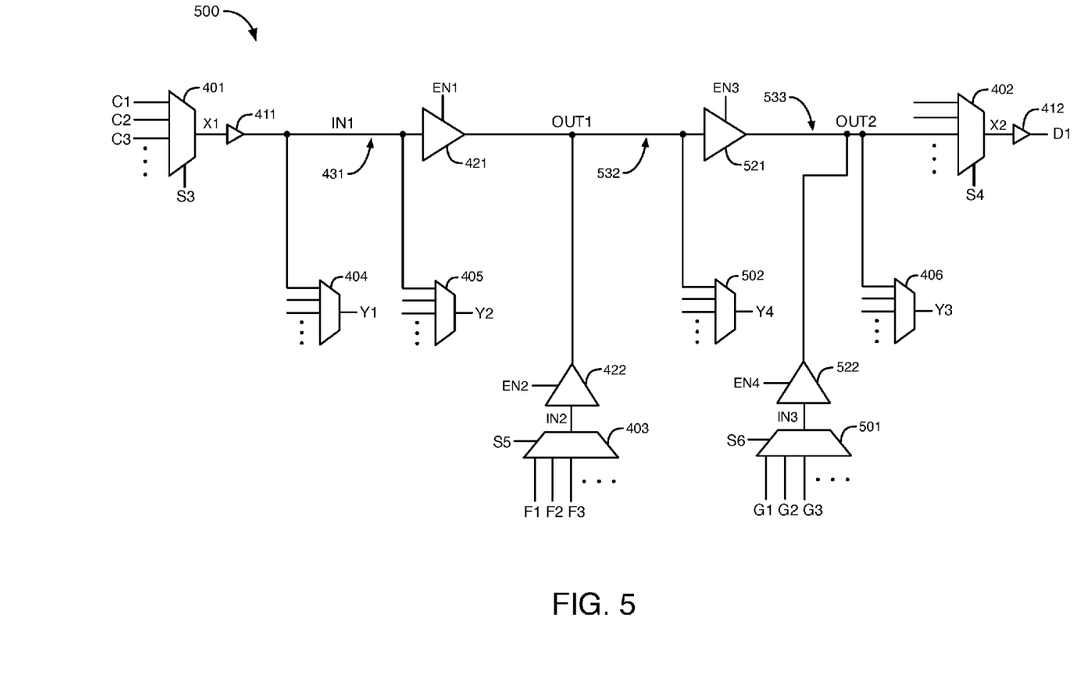
FIG. 5 illustrates yet another example of routing circuitry in an integrated circuit that includes programmable repeater circuits, according to a further embodiment.

FIG. 5 illustrates yet another example of routing circuitry 500 in an integrated circuit that includes programmable repeater circuits, according to a further embodiment. Routing circuitry 500 includes multiplexer circuits 401-406 and 501-502, buffer circuits 411-412, programmable repeater circuits 421-422 and 521-522, and conductors 431 and 532-533. According to various embodiments, one, two, three, or all four of programmable repeater circuits 421-422 and 521-522 of FIG. 5 have the architecture of programmable repeater circuit 301 as shown in FIG. 3. Signals IN, OUT, and EN in FIG. 3 correspond to signals IN3, OUT2, and EN4, respectively, for repeater circuit 522. Signals IN, OUT, and EN in FIG. 3 correspond to signals OUT1, OUT2, and EN3, respectively, for repeater circuit 521.

In routing circuitry 500, the routing input of repeater circuit 521 is coupled to the outputs of repeater circuits 421-422 and to a multiplexing input of multiplexer circuit 502. The output of repeater circuit 521 is coupled to the output of repeater circuit 522 and to a multiplexing input of each of multiplexer circuits 402 and 406.

FIG. 5 illustrates only a portion of the integrated circuit. Routing circuitry 500 shown in FIG. 5 may be fabricated in any type of integrated circuit, such as a programmable logic integrated circuit, an ASIC, a memory integrated circuit, a central processing unit, a microprocessor, etc.

According to an embodiment, routing circuitry 500 of FIG. 5 is an example of routing circuitry 245 shown in FIG. 2D. In this embodiment, routing circuitry 500 can route a signal between two or more of LAB circuits 241A-241C, memory circuit 242, and DSP circuit 243 through programmable repeater circuits 421 and 521, 422 and 521, 422 and 522, or 421 and 522, as described below.

Enable signals EN1, EN2, EN3, and EN4 are provided to enable inputs of repeater circuits 421, 422, 521, and 522, respectively. Circuitry 500 can be set into at least four configurations. The at least four configurations of circuitry 500 can provide increased routing flexibility to the integrated circuit as discussed in detail below.

In a first configuration of circuitry 500, repeater circuits 421 and 521 are enabled, and repeater circuits 422 and 522 are disabled. Repeater circuit 421 is enabled to generate an output signal OUT1 at its output based on input signal IN1 at its routing input in response to enable signal EN1 being asserted. Signal OUT1 is provided through conductor 532 to a routing input of repeater circuit 521 and to multiplexer circuit 502. Repeater circuit 521 is enabled to generate an output signal OUT2 at its output based on signal OUT1 at its routing input in response to enable signal EN3 being asserted. Signal OUT2 is provided through conductor 533 to a multiplexing input of each of multiplexer circuits 402 and 406. When repeater circuits 421 and 521 are enabled in the first configuration, programmable repeater circuits 422 and 522 are disabled by enable signals EN2 and EN4 to avoid contention on conductors 532 and 533, respectively. Repeater circuits 421 and 521 can significantly reduce RC delay on conductors 431, 532, and 533 in the first configuration.

In a second configuration of circuitry 500, repeater circuits 422 and 521 are enabled, and repeater circuits 421 and 522 are disabled. Repeater circuit 422 is enabled to generate an output signal OUT1 at its output based on input signal IN2 at its routing input in response to enable signal EN2 being asserted. Repeater circuit 521 is enabled to generate an output signal OUT2 at its output based on signal OUT1 at its routing input in response to enable signal EN3 being asserted. Signal OUT2 is provided through conductor 533 to multiplexing inputs of multiplexer circuits 402 and 406. In the second configuration, signal IN1 can be provided from buffer circuit 411 to multiplexer circuits 404-405, while signal OUT2 is generated based on signal IN2 and provided to multiplexer circuits 402 and 406. When repeater circuits 422 and 521 are enabled in the second configuration, repeater circuits 421 and 522 are disabled by enable signals EN1 and EN4 to avoid contention on conductors 532 and 533, respectively.

In a third configuration of circuitry 500, repeater circuits 421 and 522 are enabled, and repeater circuits 422 and 521 are disabled. In the third configuration, signal OUT1 is generated by repeater circuit 421 and provided to a multiplexing input of multiplexer circuit 502. Signal IN3 is provided through a conductor to a routing input of repeater circuit 522. Repeater circuit 522 is enabled to generate output signal OUT2 at its output based on signal IN3 at its routing input in response to enable signal EN4 being asserted. Multiplexer circuit 501 generates signal IN3 at its output based on the one of its input signals G1, G2, G3, etc. that is selected in response to select signals S6. In the third configuration, signal IN1 is provided from buffer circuit 411 to multiplexer circuits 404-405, and signal OUT2 is generated based on signal IN3 and provided to multiplexer circuits 402 and 406. When repeater circuits 421 and 522 are enabled in the third configuration, repeater circuits 422 and 521 are disabled by enable signals EN2 and EN3 to avoid contention on conductors 532 and 533, respectively.

In a fourth configuration of circuitry 500, repeater circuits 422 and 522 are enabled, and repeater circuits 421 and 521 are disabled. In the fourth configuration, signal OUT1 is generated by repeater circuit 422 based on signal IN2, and signal OUT1 is provided to a multiplexing input of multiplexer circuit 502. Also, in the fourth configuration, output signal OUT2 is generated by repeater circuit 522 based on signal IN3, and signal OUT2 is provided to multiplexing inputs of multiplexer circuits 402 and 406. In the fourth configuration, signal IN1 may be provided from buffer circuit 411 to multiplexer circuits 404-405. When repeater circuits 422 and 522 are enabled in the fourth configuration, repeater circuits 421 and 521 are disabled by enable signals EN1 and EN3 to avoid contention on conductors 532 and 533, respectively.

Figure 6:
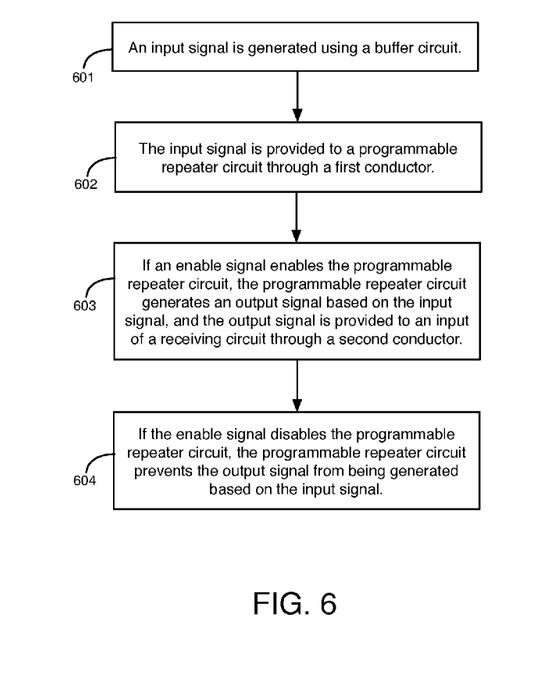
FIG. 6 is a flow chart illustrating operations that can be performed to reduce delay in a signal provided through conductors in an integrated circuit using a programmable repeater circuit, according to an embodiment.

FIG. 6 is a flow chart illustrating operations that can be performed to reduce delay in a signal provided through conductors in an integrated circuit using a programmable repeater circuit, according to an embodiment. In operation 601, an input signal is generated using a buffer circuit. In operation 602, the input signal is provided to a programmable repeater circuit through a first conductor. In operation 603, if an enable signal enables the programmable repeater circuit, the programmable repeater circuit generates an output signal based on the input signal, and the output signal is provided to an input of a receiving circuit through a second conductor. In operation 604, if the enable signal disables the programmable repeater circuit, the programmable repeater circuit prevents the output signal from being generated based on the input signal. The programmable repeater circuit of FIG. 6 may be, for example, programmable repeater circuit 200, 230, or 301.

The methods and apparatuses described herein may be incorporated into any suitable electronic device or system of electronic devices. For example, the methods and apparatuses may be incorporated into numerous types of devices such as microprocessors or other integrated circuits (ICs). Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), and graphics processing units (GPUs).

The integrated circuits described herein may be part of a data processing system that includes one or more of the following components: a processor; memory; input/output circuitry; and peripheral devices. The integrated circuits can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or in a different order, or described operations may be distributed in a system that allows the occurrence of the processing operations at various intervals associated with the processing.

The foregoing description of the exemplary embodiments of the present invention is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit comprising:
a buffer circuit;
a programmable repeater circuit comprising a first routing input and a first enable input; and
a receiving circuit,
wherein the programmable repeater circuit buffers a first input signal received at the first routing input from the buffer circuit through a first conductor to generate a first output signal that is provided to an input of the receiving circuit through a second conductor only in response to a first enable signal at the first enable input enabling the programmable repeater circuit,
wherein the programmable repeater circuit causes the first output signal to remain in a constant and predefined logic state in response to the first enable signal disabling the programmable repeater circuit.

2. The integrated circuit of claim 1, wherein the programmable repeater circuit prevents the first input signal received at the first routing input from being driven to the input of the receiving circuit through the second conductor in response to the first enable signal disabling the programmable repeater circuit.

3. The integrated circuit of claim 1, wherein the receiving circuit is a multiplexer circuit.

4. The integrated circuit of claim 1, further comprising:
a first multiplexer circuit, wherein an input of the buffer circuit is coupled to an output of the first multiplexer circuit.

5. The integrated circuit of claim 4, wherein the receiving circuit is a second multiplexer circuit.

6. The integrated circuit of claim 1, wherein the programmable repeater circuit comprises a NAND logic gate circuit comprising a first input coupled to the first routing input and a second input coupled to the first enable input.

7. An integrated circuit comprising:
a buffer circuit;
a first programmable repeater circuit comprising a first routing input and a first enable input;

a receiving circuit, wherein the first programmable repeater circuit buffers a first input signal received at the first routing input from the buffer circuit through a first conductor to generate a first output signal that is provided to an input of the receiving circuit through a second conductor only in response to a first enable signal at the first enable input enabling the first programmable repeater circuit; and a second programmable repeater circuit comprising a second routing input and a second enable input, wherein the second programmable repeater circuit buffers a second input signal received at the second routing input through a third conductor to generate a second output signal that is provided to the second conductor only in response to a second enable signal at the second enable input enabling the second programmable repeater circuit, and wherein the second enable signal only enables the second programmable repeater circuit when the first enable signal disables the first programmable repeater circuit.

8. The integrated circuit of claim 7 further comprising:
a third programmable repeater circuit comprising a third routing input and a third enable input, wherein the third programmable repeater circuit buffers the first output signal or the second output signal on the second conductor to generate a third output signal that is provided to the input of the receiving circuit through a fourth conductor only in response to a third enable signal at the third enable input enabling the third programmable repeater circuit.

9. The integrated circuit of claim 8 further comprising:
a fourth programmable repeater circuit comprising a fourth routing input and a fourth enable input, wherein the fourth programmable repeater circuit buffers a third input signal received at the fourth routing input through a fifth conductor to generate a fourth output signal that is provided to the input of the receiving circuit through the fourth conductor only in response to a fourth enable signal at the fourth enable input enabling the fourth programmable repeater circuit.

10. An integrated circuit comprising:
a first multiplexer circuit;
a driver circuit coupled to an output of the first multiplexer circuit;
a first conductor coupled to an output of the driver circuit;
a first programmable repeater circuit;
a second conductor; and
a second multiplexer circuit coupled to the second conductor, wherein the programmable repeater circuit receives a first input signal from the driver circuit via the first conductor, wherein the driver circuit generates the first input signal by buffering a signal generated by the first multiplexer circuit, wherein the first programmable repeater circuit generates a first output signal based on the first input signal and provides the first output signal to the second multiplexer circuit via the second conductor when a first enable signal enables the first programmable repeater circuit, and wherein the first programmable repeater circuit prevents the first output signal from being generated based on the first input signal when the first enable signal disables the first programmable repeater circuit.

11. The integrated circuit of claim 10, wherein the first programmable repeater circuit comprises a NAND logic gate circuit coupled to receive the first input signal and the first enable signal.

12. The integrated circuit of claim 10, wherein the first programmable repeater circuit comprises first, second, third, and fourth transistors that are coupled in series, wherein the first and second transistors are responsive to the first enable signal, and wherein the third and fourth transistors are responsive to the first input signal and generate the first output signal at an output.

13. The integrated circuit of claim 10 further comprising:
a second programmable repeater circuit that generates a second output signal based on a second input signal when a second enable signal enables the second programmable repeater circuit, wherein the second output signal is provided to the second conductor, and wherein the second programmable repeater circuit prevents the second output signal from being generated based on the second input signal when the second enable signal disables the second programmable repeater circuit.

14. The integrated circuit of claim 13 further comprising:
a third programmable repeater circuit that generates a third output signal based on the first output signal or the second output signal when a third enable signal enables the third programmable repeater circuit, wherein the third output signal is provided to the second multiplexer circuit through a third conductor, and wherein the third programmable repeater circuit prevents the third output signal from being generated when the third enable signal disables the third programmable repeater circuit.

15. The integrated circuit of claim 14 further comprising:
a fourth programmable repeater circuit that generates a fourth output signal based on a third input signal when a fourth enable signal enables the fourth programmable repeater circuit, wherein the fourth output signal is provided to the second multiplexer circuit through the third conductor, and wherein the fourth programmable repeater circuit prevents the fourth output signal from being generated based on the third input signal when the fourth enable signal disables the fourth programmable repeater circuit.

16. A method comprising:
generating a first input signal using a buffer circuit;
providing the first input signal to a first programmable repeater circuit through a first conductor;
if a first enable signal enables the first programmable repeater circuit, generating a first output signal based on the first input signal using the first programmable repeater circuit and providing the first output signal to an input of a receiving circuit through a second conductor;
if the first enable signal disables the first programmable repeater circuit, preventing the first output signal from being generated based on the first input signal using the programmable repeater circuit; and
causing the first output signal to remain in a constant and predefined logic state if the first enable signal disables the first programmable repeater circuit.

17. The method of claim 16, further comprising:
selecting a second input signal using a first multiplexer circuit to generate a selected signal at an input of the buffer circuit.

18. The method of claim 17, wherein the receiving circuit is a second multiplexer circuit.

19. The method of claim 16, wherein the receiving circuit is a multiplexer circuit.

20. The method of claim 16 further comprising:
if a second enable signal enables a second programmable repeater circuit, generating a second output signal based on a second input signal using the second programmable repeater circuit and providing the second output signal to the second conductor; and if the second enable signal disables the second programmable repeater circuit, preventing the second output signal from being generated based on the second input signal using the second programmable repeater circuit.

\* \* \* \* \*